United States Patent [19]

Ueda et al.

[11] Patent Number: 5,521,292
[45] Date of Patent: May 28, 1996

[54] COMPOSITIONS COMPRISING NEUTRALIZED POLYSACCHARIDE DERIVATIVES

[75] Inventors: Ikuo Ueda; Nomura Tadanori, both of Nobeoka, Japan

[73] Assignee: Asahi Kasei Kabushiki Kaisha, Japan

[21] Appl. No.: 389,079

[22] Filed: Feb. 13, 1995

Related U.S. Application Data

[63] Continuation of Ser. No. 976,085, Nov. 13, 1992, abandoned.

[30] Foreign Application Priority Data

Nov. 15, 1991 [JP] Japan ..................... 3-300189

[51] Int. Cl.$^6$ ............. A61K 31/715; C07H 13/02; C08B 5/02; C08B 37/00
[52] U.S. Cl. .............. 536/2; 536/3; 536/17.9; 536/35; 536/20; 536/63; 536/110; 536/119; 536/123.1
[58] Field of Search ............. 536/20, 17.9, 35, 536/63, 110, 119, 121, 123.1, 2, 3; 514/54, 55, 57, 60

[56] References Cited

U.S. PATENT DOCUMENTS

| Re. 30,459 | 12/1980 | Schweiger | 536/50 |
|---|---|---|---|
| 3,638,698 | 1/1972 | Woodman et al. | 149/2 |
| 3,808,199 | 4/1974 | Lin et al. | 536/34 |
| 4,143,226 | 3/1979 | Schweiger | 536/59 |

FOREIGN PATENT DOCUMENTS

| 0107867 | 9/1984 | European Pat. Off. . |
|---|---|---|
| 2737699 | 3/1979 | Germany . |
| 58-69214 | 4/1983 | Japan . |
| 58-80358 | 5/1983 | Japan . |
| 59-71342 | 4/1984 | Japan . |
| 60-195172 | 10/1985 | Japan . |
| 96819 | 6/1989 | Romania . |
| 753391 | 7/1956 | United Kingdom . |
| 799184 | 8/1958 | United Kingdom . |
| 1120373 | 7/1968 | United Kingdom . |

*Primary Examiner*—Douglas W. Robinson
*Assistant Examiner*—Everett White
*Attorney, Agent, or Firm*—Pennie & Edmonds

[57] ABSTRACT

The present invention provides:

(1) a polysaccharide derivative having hydrophilic functional groups and nitrate groups per one repeating unit in the following range:

$$0.2 \leq X \leq 1.5,\ 0.4 \leq Y \leq 2.2,\ X+Y<3;$$

wherein X and Y represent the number of hydrophilic functional groups and nitrate groups, respectively;

(2) the neutralized polysaccharide derivative;

(3) the composition used as a binder containing the neutralized polysaccharide and water; and (4) the composition used as a vehicle containing the neutralized polysaccharide, a resin, an organic solvent and water.

The vehicle composition has excellent properties such as drying characteristic, pigment dispersibility, compatibility with water soluble resins and thixotropic property, and it can form a clear continuous film having excellent heat resistance and blocking resistance.

7 Claims, No Drawings

COMPOSITIONS COMPRISING NEUTRALIZED POLYSACCHARIDE DERIVATIVES

This is a continuation of application Ser. No. 07/976,085, filed Nov. 13, 1992, now abandoned.

BACKGROUND OF THE INVENTION

1. Field of the Invention

The present invention relates to polysaccharide derivatives having specific numbers of hydrophilic functional groups and nitrate groups; the neutralized polysaccharide derivatives; compositions used as a binder (hereinafter referred to as binder compositions) comprising the neutralized polysaccharide derivatives, water and minimum amount of organic solvents; and compositions used as a vehicle (hereinafter referred to as vehicle compositions) comprising the binder composition and a water-dispersible resin and/or a water-soluble resin.

2. Description of Related Art

It is know that cellulose nitrate is often used for printing compositions, paper coatings, fabric surface coatings, and functional coatings such as magnetic coatings and conductive paste for its excellent properties such as pigment dispersibility, drying characteristic, compatibility with various types of coating resins, thixotropic properties, heat resistance and blocking resistance. In most uses mentioned above, cellulose nitrate is used for coatings containing organic solvents wherein organic solvents are evaporated to form films. The evaporated organic solvents cause air pollution, a deterioration of working environment, danger of fires, etc. Therefore, various types of aqueous coatings have been developed in place of the coatings containing organic solvents.

As representative examples of the aqueous coatings, coatings comprising a water-soluble resin and/or a water-dispersible resin such as an acrylic copolymer and a stylene-maleic acid copolymer are known. However, they have not been widely used except for building in the form of emulsion, since their properties are not statisfactory. Carboxymethylcellulose (sometimes referred to hereinafter as CMC), hydroxymethylcellulose etc. which are known as water-soluble polysaccharides do not have sufficient compatibility with resins for aqueous coatings and pigment dispersibility.

Consequently, there has been strong demand for a novel vehicle composition containing a composition having properties as those of cellulose nitrate, but not capable of causing air pollution, a deterioration of working environment, danger of fires etc. in use.

For the purpose of solving the above problems, it has been proposed to use cellulose nitrate in the form of (i) lacquer emulsion and (ii) water dispersion of cellulose nitrate/acrylic copolymer. The former case (i) includes an aqueous dispersion known as aqueous coatings for leather, which is obtained by dissolving cellulose nitrate in an organic solvent with a plasticizer and/or resins capable of being dissolved in organic solvents, and dispersing the resultant in water in the presence of an emulsifier. However, the aqueous dispersion has substantially the above-mentioned problems, because it contains a large quantity of organic solvents.

The latter case (ii) includes an aqueous dispersion disclosed in Japanese Patent Application Laid-Open Nos. 80358/1983, 69214/1983 and 195172/1985. The aqueous dispersion can be obtained by dissolving cellulose nitrate in an acrylic monomer or oligmer, and dispersing the resultant in water with an emulsifier, followed by subjecting to a radical polymerization. However, cellulose nitrate being used in the aqueous dispersion is essentially hydrophobic and the aqueous dispersion contains a large amount of organic solvents. Consequently, the aqueous dispersion still has the above-mentioned problems.

Polysaccharide derivatives having carboxyl groups and nitrate groups are disclosed in the following specifications. Japanese Patent Application Laid-Open No. 71342/1984 discloses water dispersible compositions comprising an oil phase containing oxidized nitrocellulose having 2 mg equivalent/100 g or more of carboxyl groups and a low water-soluble solvent capable of dissolving the oxidized nitrocellulose; and an water phase having water as a main component. The oxidized nitrocellulose having anionic hydrophilic functional groups and hydrophobic ester functional groups can lessen the amount of an emulsifier used. Consequesntly, the heat resistance and water resistance of the obtained films are improved, but air pollution, a deterioration of working enviornment, danger of fires, etc. are not sufficiently improved since the compositions contain a large amount of organic solvents. Also, the oxidized nitrocellulose is substantially insoluble in water or a mixture of water and organic solvents since the amount of the hydrophilic functional groups is not large enough.

Crosslinked CMC having carboxymethyl ether groups and nitrate groups for solid propellants is proposed in U.S. Pat. No. 3,638,698 and the process thereof is proposed in German Patent No. 2,737,699. However, they do not teach the use in aqueous coatings at all.

Further, Rumanian Patent No. 96819 discloses a process for producing polysaccharide derivatives having carboxymethyl ether groups and nitrate groups, and the products obtained thereby to be used as a stabilizer in alkaline suspensions or as a thickening agent. However, there is no disclosure regarding the use of the product in aqueous coatings.

Thus, conventional coatings, which involve the above-mentioned problems, have not been adequate for aqueous coatings.

SUMMARY OF THE INVENTION

The present invention provides:

(1) a polysaccharide derivative having hydrophilic functional groups and nitrate groups in the following range:

$$0.2 \leq X \leq 1.5,\ 0.4 \leq Y \leq 2.2,\ X+Y<3;$$

wherein X and Y represent the number of hydrophilic functional groups and nitrate groups per one repeating unit in the polysaccharide derivative, respectively;

(2) a polysaccharide derivative having hydrophilic functional groups and nitrate groups as defined in (1) and having at least 1% by mole of the hydrophilic functional groups being neutralized;

(3) a binder composition comprising the neutralized polysaccharide derivative and water; and (4) a vehicle composition comprising the binder composition, a minimum amount of organic solvent, and a water-dispersible resin and/or a water-soluble resin.

The polysaccharide derivative of the present invention having at least 1% by mole of the hydrophilic functional groups being neutralized can be present in a binder composition wherein the polysaccharide deriative is dissolved or dispersed in a mixture comprising water and minimum amount of organic solvents. The vehicle composition can be obtained by adding a water-dispersible resin and/or a water-soluble resin to the resultant binder composition. The vehicle composition of the present invention does not cause problems such as air pollution, a deterioration of working environment, and danger of fires, etc. in its use. The vehicle composition itself has excellent properties such as drying charateristic, pigment dispersibility, compatibility with water soluble resins and thixotropic property. Also, it can form a clear continuous film having excellent heat resistance and blocking resistance.

DETAILED DESCRIPTION OF THE INVENTION

Polysaccharide Derivatives

In one aspect of the present invention, there is provided a polysaccharide derivative having the specific numbers of hydrophilic functional groups and nitrate groups and a neutralized polysaccharide derivative.

The term "one repeating unit" used herein refers to a heterocyclic ring of monosaccharide composing a polysaccharide, and preferably a pyranose because of its ease in nitration. Representative examples of pyranose include glucose, mannose and xylose. In the present invention, it is preferred that the number of the repeating unit be in the range of 20 to 1,000 and molecular weight be in the range of 3,000 to 300,000 so as to get a practical viscosity.

The term "hydrophilic functional groups" used herein refers to characteristic anionic or cationic functional groups originating from polysaccharides and/or anionic or cationic functional groups introduced by chemical modification.

Such characteristic anionic or cationic functional groups of the polysaccharide are anionic or cationic functional groups directly bonded to a heterocyclic ring of a monosaccharide composing specific polysaccharide obtained from nature, for example, carboxyl groups of alginic acid and pectin and amino groups of chitosan.

Anionic or cationic functional groups introduced by chemical modification are anionic or cationic functional groups introduced by etherification or esterification of a hydroxyl group composing a polysaccharide. Representative examples of the anionic groups include a carboxy group of CMC, carboxymethylstarch and carboxyethylcellulose; a sulfo group of sulfonylethylcellulose and the like; and a phosphate group of phosphorylcellulose and the like. Representative examples of the cationic groups include an amino group of aminoethylcellulose, etc., and an imino group of iminoethylcellulose, etc.

In the present invention, the polysaccharide derivatives having anionic hydrophilic functional groups preferably has a carboxyl group because their raw material is highly available and because the derivatives are easily nitrated. Representative examples of such polysaccharide derivatives include nitrates of alginic acid, pectin, etc.; nitrates of carboxyalkylcellulose such as CMC, carboxyethylcellulose, etc.; and nitrates of carboxy-alkylstarches such as carboxymethylstarch, carboxyethylstarch, etc. Among them, nitrates of alginic acid and pectin are preferable because they have uniform intermolecular distribution of carboxyl groups and their solutions are fairly soluble.

In view of the ease of controlling the number of functional groups and the molecular weight, the polysaccharide derivative represented by the following general formula I is preferred.

$$[GLU.(OCH_2COOH)_x(ONO_2)_y(OH)_z]_n \qquad (I)$$

wherein GLU. represents a residual group of glucose; X and Y are as defined above, and Z respresents the number of hydroxyl groups; $0.2 \leq X \leq 1.5$; $0.4 \leq Y \leq 2.2$; $X+Y<3$; $X+Y+Z=3$; and n is an integer in the range of 20 to 1,000.

Representative examples of the above polysaccharide derivative include CMC nitrate and carboxymethylstarch nitrate satisfying the above condition.

From the standpoint of keeping thickening and gelation of aqueous coatings containing particular pigments at a low level, sulfoalkylcellulose and phosphoalkylcellulose are preferable because of their higher degree of dissociation compared to that of cellulose having carboxyl groups.

In the present invention, the polysaccharide derivatives having a cationic group are preferably those having amino groups, because their raw material is highly available and because the derivatives are easily nitrated. Such derivatives are, for example, nitrates of aminoethylcellulose, aminoethylstarch and chitosan.

The polysaccharide derivatives of the present invention have hydrophilic functional groups and nitrate groups in the following range:

$$0.2 \leq X \leq 1.5, \ 0.4 \leq Y \leq 2.2;$$

wherein X and Y are as defined above.

When X is under 0.2, the polysaccharide derivatives cannot have sufficient solubility and dispersibility in a mixture of water and a minimum amount of organic solvents. When X is over 1.5, the polysaccharide derivatives cannot form a film having good water resistance. When Y is under 0.4, the polysaccharide derivatives cannot have sufficient compatibility with a water-soluble resin or a dispersible resin. Also, they cannot have sufficient dispersibility of pigments. When Y is over 2.2, the polysaccharide derivatives require a lot of organic solvents to dissolve or disperse in a mixture of water and a minimum amount of organic solvents. The total amount of X and Y is theorectically less than 3.

In the present invention, the preferable range of Y is $0.4 \leq Y \leq 1.5$. When Y is within this range, the polysaccharide derivatives can be employed with alcohols having 1 to 5 carbon atoms such as methanol, ethanol, isopropyl alcohol, n-butanol and n-pentanol. Therefore, these polysaccharide deivatives are advantageous from the viewpoint of environmental safety and low odor, when they are used as aqueous coatings.

The Neutralized Polysaccharide Derivatives

At least 1% by mole of the functional groups of the polysaccharide derivatives is particularly and preferably neutralized, more preferably 10% by mole or more. The polysaccharide derivatives of which the neutralization degree is 1% by mole or more, can be dispersed or dissolved in water containing a very small amount of organic solvents. Therefore, they beneficially reduce air pollution, improve the working environment and reduce the danger of fires.

The term "neutralized" used herein means that a part of or all of the anionic or cationic functional groups of the polysaccharide derivatives forms a salt with ions of the neutralization agent mentioned below. The neutralization degree is determined from equivalent weight of the anionic or cationic groups of the polysaccharide derivatives or of the composition containing the polysaccharide derivative, and equivalent weight of ions of the neutralization agent. The neutralization degree can be measured by titrating the unneutralized anionic and cationic groups of the polysaccharide derivatives with acids and bases.

The neutralization agent, which is used to neutralize the polysaccharide derivatives having the anionic functional group, includes an alkali metal compound, an alkali earth metal compound, ammonia, an organic amine having at least one amino group per one molecule, a hydrazine and a hydrazine derivative. The alkali metal compound indicates compounds of the atoms in I A group of periodic table, for example, hydroxides such as lithium hydroxide, sodium hydroxide and potassium hydroxide; and carbonates such as sodium bicarbonate, potassium bicarbonate, sodium carbonate, potassium carbonate. The alkali earth metal compound indicates compounds of the atoms in I B group of periodic table, for example, hydroxides such as magnesium hydroxide, calcium hydroxide and barium hydroxide; and carbonates such as magnesium bicarbonate, calcium bicarbonate and magnesium carbonate. The organic amine having at least one amino group per one molecule includes compounds having at least one primary, secondary or tertiary amine per one molecule, for example, alkylamines such as ethylamine, propylamine, butylamine and triethylamine, dimethylethanolamine, N-methylpyrrolidone, ethylenediamine, diethylenetriamine, triethylene tetramine, ethanol amine, trimethanol amine and N,N'-tetramethyl ethylene diamine. The hydrazine derivative includes hydrazine, methylhydrazine, ethylhydrazine and derivatives thereof. Among the neutralization agent described above, the alkali metal compound, ammonia and the organic amine having one amino group per one molecule are preferred. If, for example, the alkali earth metal compound and the organic amine having two or more amino groups per one molecule are used, the prepared binder composition sometimes has extremely high viscosity, or the polysaccharide derivatives sometimes separate out or precipitate in the binder composition.

The neutralization agent, which is used to neutralize the polysaccharide derivatives having cationic functional groups, includes inorganic acids such as hydrochloric acid, nitric acid, phosphoric acid and sulfuric acid and organic acids having one or more carboxyl groups per one molecule. Representative examples of the organic acids having one or more carboxyl groups are formic acid, acetic acid, propionic acid, oxalic acid, succinic acid, maleic acid, fumaric acid, benzonic acid and phutalic acid. Among the neutralization agent described above, hydrochloric acid, nitric acid and organic acids having one carboxyl groups per one molecule are preferred. When acids other than the above are employed, for example, dibasic or polybasic inorganic acids or organic acids having two or more of carboxyl groups per one molecule is used, the prepared binder composition sometimes has extremely high viscosity, or the poysaccharide derivatives sometimes separate out or precipitate in the binder composition.

In the present invention, it is preferred that the boiling point of the above-mentioned neutralization agent be under 100° C. After applying binder or vehicle composition containing the neutralization agent and the polysaccharide derivatives, the solvent containing the neutralization agent and water as a main component are evaporated to form a water resistant film.

Representative examples of the neutralization agent having a boiling point of 100° C. or less include ammonia and triethylamine which are used to neutralize the polysaccharide derivatives having anionic functional groups; and hydrochloride acid, nitric acid and acetic acid for those having cationic functional groups.

Binder Composition

In another aspect of the present invention, there is provided a binder composition including the above-mentioned neutralized polysaccharide derivatives, the composition of which is as follows:

| (a) | polysaccharide derivatives having hydrophilic functional groups and nitrate groups in the following range: $0.2 \leq X \leq 1.5, 0.4 \leq Y \leq 2.2, X + Y < 3$ (wherein X and Y represent the number of hydrophilic functional groups and nitrate groups per one repeating unit, respectively); and having at least 1% by mole of the hydrophilic functional groups being neutralized | 1 to 40 wt. % |
|---|---|---|
| (b) | organic solvents | 0 to 45 wt. % |
| (c) | water | 30 to 98 wt. % |

When the amount of component (a) is over 40% by weight, the binder composition does not have good flowability. When it is under 1% by weight, it is not practical.

When the amount of component (b) is over 45% by weight, it is not preferable because of air pollution, adverse working environment and danger of fires. The preferable amount of component (b) is under 20% by weight, more preferably under 10% by weight, because a flashpoint is not observed. The amount of component (b) can be 0% by weight, but is preferably at least 1% by weight to obtain a solution, from which a clear and continuous film is obtained.

When the amount of component (c) is over 98 % by weight, it is not practical because the concentration of the polysaccharide derivatives is too low. When the amount of component (c) is under 30% by weight, it is not preferable from the viewpoint of a safe working environment and danger of fires.

As a further improvement, an anti-foaming agent, an antiseptic agent, a mildewproofing agent, a pH adjustor, a heat stabilizer, a light stabilizer, etc. can be added. Further, a stabilizer having nitrogen, a stabilizer derived from phosphoric acid, a stabilizer derived from phosphorous acid and a stabilizer having an epoxide group may be added.

As component (b), an organic solvent compatible with water is used, which solvent is generally used for a coating, a printing composition, etc. The type of the organic solvent used can be selected according to the value of Y of component (a). When Y is more than 1.5 and not more than 2.2, esters such as methyl acetate and ethyl acetate; ketones such as acetone and methyl ethyl ketone; glycol ethers such as ethylene glycol monoethyl ether, ethylene glycol monobutyl ether and propylene glycol monomethyl ether; and ethers such as tetrahydrofuran and dioxane can be employed. When Y is in the range of 0.4 to 1.5, an alcohol having 1 to 5 carbon atoms such as methanol, ethanol, isopropanol, n-butanol and n-pentanol can be employed in addition to the above solvents. The solvent can be used alone or in combination with the above solvents. Component (b) is preferably water-soluble, or preferably contains the alcohol having 1 to 3 carbon atoms.

As component (b), an organic solvent incompatible with water can be used together with the organic solvent compatible with water in the range that the polysaccharide derivative does not become insoluble. The organic solvent incompatible with water are those which are generally used for a coating, printing compositions, etc. Examples of the organic solvent include ketones such as methyl isobutyl ketone and diisobutyl ketone; esters such as n-butyl acetate and isobutyl acetate; alcohols such as n-butanol and isobutanol; and hydrocarbon such as toluene and xylene.

A preferable combination of components (a) and (b) is that component (a) is composed of polysaccharide derivatives having Y in the range of 0.4 to 1.5 and component (b) is composed of at least one organic solvent selected from alcohols having 1 to 3 carbon atoms. The binder composition containing the above combination can provide aqueous coatings capable of forming clear and continuous films. Therefore, they are advantageous from the viewpoint of environmental safety and reduced odor.

The binder composition of the present invention can assume two forms according to the neutralization degree of polysaccharide derivatives used as component (a) and the types of organic solvents used as component (b). One is an aqueous solution wherein the neutralized polysaccharide derivatives are substantially dissolved in other components. The other is an aqueous dispersion wherein the neutralized polysaccharide derivatives are substantially uniformly dispersed in other components. In the aqueous solution, it is preferable that the neutralization degree of polysaccharide derivatives be 60% or more to lessen the amount of organic solvents to be used. In the aqueous dispersion, it is preferable that the neutralization degree be 60% or less to keep the viscosity low and get high concentration. The aqueous solution exhibits the excellent thickening property and dispersibility of pigments, on the other hand the aqueous dispersion is capable of containing high concentration of polysaccharide derivatives. In the present invention, either form of the binder compositions can be used as a component of the aqueous coatings, and they can also be combined for use.

In the aqueous dispersion, component (b), i.e., organic solvents may be eliminated. When the organic solvents are used, the organic solvents incompatible with water are present in an amount of at least 50% by weight so as to retain the stability of the aqueous dispersion.

Vehicle Composition

The vehicle composition can be prepared by further adding a water-soluble resin and/or a water-dispersible resin to the above binder composition. That is, one of the embodiments of the present invention relates to a vehicle composition comprising the following components (a) to (d):

| | | |
|---|---|---|
| (a) | polysaccharide derivatives having hydrophilic functional groups and nitrate groups in the following range: $0.2 \leq X \leq 1.5$, $0.4 \leq Y \leq 2.2$, $X + Y < 3$ (wherein X and Y represent the number of hydrophilic functional groups and nitrate groups per one repeating unit, respectively); and having at least 1% by mole of the hydrophilic functional groups being neutralized | 1 to 45 wt. % |
| (b) | an organic solvent | 1 to 45 wt. % |
| (c) | water | 30 to 93 wt. % |
| (d) | a water-soluble and/or water-dispersible resin | 5 to 49 wt. % | wherein a total amount of components(a) and (d) is in the range of 6 to 50% by weight.

When the amount of component (a) is under 1% by weight, drying characteristic and pigment dispersibility of the vehicle composition decrease. Also, heat resistance and blocking resistance of a film obtained therefrom decrease. When the amount of component (a) is over 45% by weight, adhesion properties of the film decreases.

With respect to component (b), any organic solvents used in the binder composition can be used. It is preferred that it should be water-soluble. When the amount of component (b) is under 1% by weight, clarity or glossiness of the film obtained from the vehicle composition is poor. When the amount of component (b) is over 45% by weight, air pollution and working environment become worse, and the danger of fires increases.

When the amount of component (c) is under 30% by weight, air pollution and working environment become worse, and the danger of fires increases. When the amount of component (c) is over 93% by weight, the film obtained from the vehicle composition becomes thin.

When the amount of component (d) is under 5% by weight, adhesion properties of the film decrease. When the amount of component (d) is over 49% by weight, flowability, pigment dispersibility of the composition and heat resistance and blocking resistance of the film obtained from the vehicle composition decrease.

A water-soluble resin includes a resin used for a water-soluble coating, ink, etc. such as a copolymer of maleic acid and styrene, a copolymer of maleic acid and an acrylic ester, a copolymer of maleic acid and a methacrylic ester, a copolymer of acrylic acid and styrene, a copolymer of acrylic acid and an acrylic ester, a copolymer of acrylic acid and a methacrylic ester, an urethane resin, a polyamide, an alkyd resin, a alkyd resin modified by an acrylic acid, an epoxidized alkyd resin, shellac, casein, polyvinyl alcohol, and a combination of more than two types of cellulose ethers such as hydroxyethyl cellulose, hydroxypropyl cellulose and carboxymethylcellulose.

A water-dispersible resin includes emulsions and latexes disclosed in tables 2–3 of page 24 in "EMULSION AND LATEX HANDBOOK" (published by Osei-sha), for example, a copolymer of styrene and butadiene, a copolymer of acrylonitrile and butadiene, a copolymer of methylmethacrylate and butadiene, polychloroprene, polyvinylpyridine, polyisoprene, a butyl rubber, a polysulfide rubber, polyurethane, polybutene, polyacrylate, polyvinyl chloride, polyvinyl acetate, polyvinylidene chloride, polyethylene, a copolymer of vinyl acetate and ethylene, an alkyd resin, an alkyd resin modified by an acrylic acid, an epoxidized alkyd resin, a copolymr of acrylic acid and styrene, an epoxy resin, a fluoroplastic, a polyester and a combination of more than two types of these resins.

When a total amount of components (a) and (d) is under 6% by weight, the film obtained from the vehicle composition becomes thin. When a total amount of components (a) and (d) is over 50% by weight, a smooth surface of the film cannot be obtained because flowability is reduced.

The binder composition and the vehicle composition of the present invention can contain the following substances in addition to the above components.

The binder composition and the vehicle composition of the present invention can contain color pigments such as titanium oxide, carbon black, phthalocyanine blue and watchung red; and extender pigments such as cacium carbonate, barytes and kaolin clay. By adding these pigments, the advantage of the compositions of the present invention as a protective or beautiful decorative coating or printing compositions is improved.

The binder composition and the vehicle composition of the present invention can contain magnetic powder such as γ-ferrit, cobalt γ-ferrit and metallic powder, so that they can be used for a coating for magnetic recording powder.

The binder composition and the vehicle composition of the present invention can contain electrically conductive materials such as gold metallic powder, silver metallic powder and cupper metallic powder and dielectric materials such as barium titanate and strontium titanate, so that they can be used for a water electrically conductive paste.

The binder composition and the vehicle composition of the present invention can contain frit glass and a fluorescent substance, so that they can be used as a coating for a fluorescent lamp or a cathode ray tube, and as a ceramic sealing compound.

The binder composition and the vehicle composition can contain various types of stabilizers in order to achieve ease of handling. The stabilizers to be used include heat stabilizers having nitrogen atoms such as diphenylamine, diethyldiphenylurea and N-nitrosodiphenylamine; heat stabilizers derived from phosphoric acid such as purophosphoric acid and sodium prophosphate; heat stabilizers derived from phosphorous acid such as tris(monononylphenyl) phosphite, tris(phenyl) phosphite and tris(ditertiarybutylphenyl) phosphite; heat stabilizers having an epoxide group such as epoxidized soybean oil and cyclophthalic epoxide; and an ethylene diamine tretraacetic acid sodium salt. The decrease of a viscosity of the compositions can be reduced by adding these stabilizers.

The binder composition and the vehicle composition can contain ultraviolet absobers such as diphenylethylenecyacnoacetic esters, benzotriazole derivatives and benzophenone and light stabilizers such as hideredamine derivatives, so as to improve the resistance to weather and light of the film.

The binder composition and the vehicle composition can contain surfactants including nonionic surface active agents such as a polyoxyethylenealkylphenylether and a polyxyethylenesorbitanalkylate as well as anionic surface active agents such as a sodium alkylbenzenesulfonate; and surfactants such as a lecithin. The increase of the viscosity of the compositions and the separation of the compostions can be inhibited by adding these surfactants.

Method for Preparing the Polysaccharide Derivatives

A method for preparing the polysaccharide derivatives of the present invention is now illustrated.

The polysaccharide derivative of the present invention is prepared by treating a raw material having the number of hydrophilic functional groups in the range of 0.2 to 1.5 per one repeating unit in the polysaccharide with a known mixed acid for nitration. For example, a mixed acid of sulfuric acid/nitric acid and a known mixed acid for nitration comprising the above mixed acids and water can be used. It is preferred that the polysaccharide derivative represented by the following formula should be used as a raw material.

$$[\text{GLU.}(\text{OCH}_2\text{COOH})_x(\text{OH})_z]_n \qquad \text{(II)}$$

wherein GLU. represents a residual group of glucose; X and Z represent the number of hydrophilic functional groups and hydroxyl groups, repsectively; $0.2 \leq X \leq 1.5$; $X+Z=3$; and n is an integer in the range of 20 to 1,000.

The mixed acid for nitration is preferably composed of nitric acid, sulphuric acid and water as this mixed acid may be reused. It is preferred that a ratio of the mixed acid for nitration to the raw material is 1 to 50 parts by volume to 1 part by weight. When the ratio is less than 1 part by volume per 1 part by weight, it is difficult to remove the heat of reaction. When the ratio is more than 50 parts by volume per 1 part by weight, too much of the acids must be recovered.

In the process for preparing the polysaccharide derivatives of the present invention, the temperature of nitration is within the range of −20° to 15° C. When the temperature of nitration is under −20° C., it takes a long time to conduct nitration uniformly due to the high viscosity of the acids. When the temperature of nitration is over 15° C., the reaction product is broken by side reaction and the yield dramatically decreases.

To wash or stabilize the polysaccharide derivatives in the present invention, known processes for preparing nitrocellulose can be used. For example, crude polysaccharide derivatives can be stirred in 10 to 100 parts by weight of hot water per 1 part by weight of the crude polysaccharide derivatives.

The number of hydrophilic functional groups and nitrate groups of the polysaccharide derivatives can be adjusted by the following factors, i.e., the total amount of hydrophilic functional groups of raw materials, the types of mixed acids for nitration, and the ratio of the raw materials to the mixed acid. In other words, the total amount of the hydrophilic functional groups is determined by that of the raw materials used. The total amount of the nitrate groups is determined by the total amount of hydroxy groups in the raw materials, the types of mixed acids used and the ratio of the raw material to the mixed acids for nitration on the basis of chemical equilibrium.

The molecular weight of the polysaccharide derivatives can be adjusted empirically by choice of raw materials and the condition of nitration. Alternatively, it can be adjusted by treating crude polysaccharide derivatives in an autoclave at 100° to 160° C. for 10 to 200 minutes. The latter is preferred because adjustment can be made with high accuracy.

Method for Preparing the Binder Compositions

In the present invention, the process for preparing the binder compositions is as follows.

The binder compositions in the form of an aqueous solution can be prepared by known processes for preparing solvent-soluble nitrocellulose. For example, water and organic solvents are measured in a vessel with a stirrer. While stirring, polysaccharide derivatives are added and neutralization agents can be added if necessary. Subsequently, stirring is continued until the content in the vessel becomes uniform resulting in a clear aqueous solution. It is preferred that the polysaccharide derivatives should be neutralized in an insoluble solvent before being mixed with the other components, because the stirring period to produce a clear binder aqueous solution is shortened. The stirring can be conducted at room temperature, and the stirring period can be further shortened by heating.

The binder composition in the form of an aqueous dispersion can be prepared by a post-emulsion method for preparing the known water-dispersible resin. For example, the organic solvent used to dissolve the polysaccharide derivatives of the present invention or the mixture of the organic solvent and water used to dissolve the derivatives are measured in a vessel with a stirrer. While stirring, the polysaccharide derivatives are added. Stirring is continued in order to obtain a uniform solution. With continued stirring, water, or if necessary, a mixture of the neutralization agent and water, is added to obtain the binder aqueous dispersion. As desired, the amount of the organic solvent in the binder aqueous dispersion can be decreased and the concentration of the polysaccharide derivatives can be increased by distillation.

Method for Preparing the Vehicle Composition

In the present invention, the processed for preparing the vehicle compositions are as follows.

The vehicle composition can be prepared by known methods for preparing compositions used as the vehicle for an aqueous coating. For example, the above prepared binder aqueous solution and/or binder aqueous dispersion, and the water-soluble resin and/or water-dispersible resin are measured in a vessel with a stirrer. While stirring, water, an organic solvent and an additive can be added to prepare the vehicle composition of the present invention.

Further, an aqueous pigment dispersion can be prepared by mixing the above prepared binder aqueous solution and the pigment and, if necessary, water, the organic solvent and the additive in a dispersion mixer such as a sand mill and a ball mill. Subsequently, the aqueous pigment dispersion, the above prepared binder aqueous solution and/or the binder aqueous dispersion, and a water-soluble resin and/or a water dispersible resin and, if necessary, water, the organic solvent and the additive can be measured in the vessel and stirred to prepare an aqueous coating for color development.

DESCRIPTION OF PREFERRED EMBODIMENTS

The present invention is now illustrated by representative examples of certain preferred embodiments thereof.

EXAMPLE 1

40 g of CMC (SEROGEN 5A (trademark) manufactured by Dai-ichi Kogyo Seiyaku Co., Ltd.; number of CMC group: 0.7) was put into a one-liter glass beaker filled with 400 ml of acid mixture, which was adjusted at 5° C. and comprised 59% by weight of sulphuric acid, 22% by weight of nitric acid and 19% by weight of water, was stirred at 5° C. for 60 minutes. The resultant reaction mixture was put into a five-liter stainless steel vessel filled with 4 liters of water, stirred for 5 minutes, and then filtered through a Buchner funnel to recover a reaction product. The obtained reaction product was put into a one-liter glass beaker filled with 800 ml of water, heated at 96° C. for 2 hours, and filtered through a Buchner funnel to recover the reaction product. The second reaction product was put into a one-liter autoclave together with 500 ml of water, heated at 130° C. for 60 minutes, and filtered through a Buchner funnel to recover an end product. The end product was dried at 80° C. for 2 hours to obtain 49 g of CMC nitrate.

The number of carboxymethyl ether groups and nitrate groups of the dried end product, respectively, was measured according to the following procedure.

0.1 g of the dried end product was accurately weighed out and subjected to an element analysis to obtain weight percent of nitrogen (P). 1 g of the dried end product was accurately weighed out in a 300 ml conical flask with ground-in stopper, where 15 ml of 80% methanol and 100 ml of N/10 sodium hydroxide were added, and shaken at room temperature for 3 hours. Subsequently, phenolphthalein was added and titration was conducted with N/10 sulphuric acid. The equivalent/g of carboxymethyl ether groups (Q) per 1 g of the sample was calculated in accordance with the following formula:

$$Q=(100-N/10 \text{ sulphuric acid } ml) \times f \times 10^{-4};$$

wherein f represents a factor of N/10 sulphuric acid.

Using the obtained weight percent of nitrogen (P) and equivalent/g of carboxymethyl ether groups (Q), the number of nitrate groups and carboxymethyl ether groups per one anhydrous glucose residual group, respectively, was calculated in accordance with the following formulas:

$$x=14yQ/p;$$

and $$y=162p/(14-45p-58\times14Q);$$

wherein x represents the number of carboxymethyl ether groups; y represents the number of nitrate groups; and p represents (P%)/100.

As the result, the dried end product had 1.3 of nitrate groups and 0.7 of carboxymethyl ether groups per one anhydride glucose residual group. The yield was 95% of the theoretical value.

EXAMPLE 2

40 g of chitosan (manufactured by Kimitsu Chemical Industries Co. Ltd., containing 15% of N-acetylamide) was put into a one-liter glass beaker filled with 400 ml of acid mixture, which was adjusted at 5° C. and comprised 59% by weight of sulphuric acid, 23% by weight of nitric acid and 18% by weight of wate, and was stirred at 5° C. for 60 minutes. The reaction system became uniform after a time. The resultant reaction mixture was put into a five-liter stainless steel vessel filled with 4 liters of isopropyl alcohol to separate out a reaction product, stirred for 5 minutes, and then filtered through a Buchner funnel to recover the reaction product. The obtained reaction product was put into a one-liter glass beaker filled with 800 ml of isopropyl alcohol, washed and filtered through a Buchner funnel to the recover an end product. The end product was dried at 80° C. for 2 hours to obtain 48 g of chitosan nitrate.

The number of amino groups and nitrate groups of the dried end product, respectively, was measured according to the following procedure.

0.1 g of the dried end product was accurately weighed out and subjected to an element analysis to obtain weight percent of a nitrogen atom (P).

Using the obtained weight percent of nitrogen atom (P), the number of nitrate groups per one anhydrous glucose residual group was calculated in accordance with the following formula:

$$y=161p/(14-45p)$$

wherein y and P are as defined in Example 1.

The dried end product had 1.4 of of nitrate groups and 1.0 of amino groups based on the raw material per one anhydride glucose residual group. The yield was 95% of the theoretical value.

EXAMPLE 3

40 g of CMC (SEROGEN 5A (trademark)) was put into a one-liter glass beaker filled with 400 ml of acid mixture, which was adjusted at 5° C. and comprised 55% by weight of sulphuric acid, 20% by weight of nitric acid and 25% by weight of water, and was stirred at 5° C. for 60 minutes. The resultant reaction mixture was put into a five-liter stainless steel vessel filled with 4 liters of water to separate out a reaction product, stirred for 5 minitues, and then filtered through a Buchner funnel to recover the reaction product. The obtained reaction product was put into a one-liter glass beaker filled with 800 ml of water, heated at 96° C. for 2 hours, and filtered through a Buchner funnel to recover an end product. The end product was dried at 80° C. for 2 hours to obtain 40 g of CMC nitrate.

According to the same procedure as in Example 1, the dried end product had 0.6 of of nitrate groups and 0.7 of carboxymethyl ether groups per one anhydride glucose residual group. The yield was 75% of the theoretical value.

EXAMPLE 4

40 g of CMC (AG GUM (trademark) manufactured by Dai-ichi Kogyo Seiyaku Co., Ltd.; number of CMC group: 1.3) was put into a one-liter glass beaker filled with 400 ml of acid mixture, which was adjusted at 5° C. and comprised 63% by weight of sulphuric acid, 25% by weight of nitric acid and 12% by weight of water, and was stirred at 5° C. for 60 minutes. The resultant reaction mixture was put into a five-liter stainless steel vessel filled with 4 liters of the mixture of water and ethanol having the weight ratio of 1:1, cooled by ice to separate out a reaction product, and then filtered through a Buchner funnel to recover the reaction product. The obtained reaction product was put into a one-liter glass beaker filled with 800 ml of water, heated at 96° C. for 2 hours, and filtered through a Buchner funnel to recover an end product. The end product was dried at 80° C. for 2 hours to obtain 42 g of CMC nitrate.

According to the same procedure as in Example 1, the dried end product had 1.3 of nitrate groups and 1.3 of carboxymethyl ether groups per one anhydride glucose residual group. The yield was 95% of the theoretical value.

EXAMPLE 5

51 g of CMC nitrate was prepared in the same manner as in Example 1, except that the acid mixture comprising 66% by weight of suphuric acid, 26% by weight of nitric acid and 8% by weight of water was used.

According to the same procedure as in Example 1, the dried end product had 1.7 of nitrate groups and 0.7 of carboxymethyl ether groups per one anhydride glucose residual group. The yield was 95% of the theoretical value.

EXAMPLE 6

47 g of CMC nitrate was prepared in the same manner as in Example 1, except that 40 g of CMC having 0.3 of carboxymethyl ether groups as a starting material and the acid mixture comprising 59% by weight of sulphuric acid, 21% by weight of nitric acid and 20% by weight of water, were employed.

According to the same procedures as in Example 1, the dried end product had 1.7 of nitrate groups and 0.3 of carboxymethyl ether groups per one anhydride glucose residual group. The yield was 92% of the theoretical value.

COMPARATIVE EXAMPLE 1

50 g of CMC nitrate was prepared in the same manner as in Example 1, except that CMC having 0.15 of carboxymethyl ether group as a starting material and the acid mixture comprising 59% by weight of sulphuric acid, 21% by weight of nitric acid and 20% by weight of water were employed.

According to the same procedure as in Example 1, the dried end product had 1.5 of of nitrate groups and 0.15 of carboxymethyl ether groups per one anhydride glucose residual group. The yield was 95% of the theoretical value.

COMPARATIVE EXAMPLE 2

15 g of CMC nitrate was prepared in the same manner as in Example 1, except that CMC having 0.3 of carboxymethyl ethers as a starting material and the acid mixture comprising 66% by weight of sulphuric acid, 26% by weight of nitric acid and 8% by weight of water were employed.

According to the same procedure as in Example 1, the dried end product had 2.6 of nitrate groups and 0.3 of carboxymethyl ether groups per one anhydride glucose residual group. The yield was 90% of the theoretical value.

COMPARATIVE EXAMPLE 3

56 g of CMC nitrate was prepared in the same manner as in Example 1, except that the acid mixture comprising 50% by weight of sulphuric acid, 20% by weight of nitric acid and 30% by weight of water was used.

According to the same procedure as in Example 1, the dried end product had 0.3 of nitrate groups and 0.7 of carboxymethyl ether groups per one anhydride glucose residual group. The yield was 35% of the theoretical value.

COMPARATIVE EXAMPLE 4

20 g of CMC nitrate was prepared in the same manner as in Example 1, except that the nitration was conducted at 30° C.

According to the same procedure as in Example 1, the dried end product had 1.3 of nitrate groups and 0.7 of carboxymethyl ether groups per one anhydride glucose residual group. The yield was 39% of the theoretical value.

EXAMPLE 7

15 g of CMC nitrate prepared in Example 1 was put into a 500 ml glass beaker filled with 300 g of a mixture having a weight ratio of isopropyl alcohol to water of 9:1, and stirred. After 40 g of 1 N-aqueous ammonia was added to the beaker with stirring, stirring was further continued at room temperature for 2 hours. The obtained product was filtered through a glass filter. According to the same procedure as in Example 1, the number of the carboxymethyl ether group of the product was 0.1. The amount of neutralized carboxy group was determined by the difference of the numbers of the carboxymethyl ether group before and after a treatment with ammonia. 0.6 of carboxymethyl ether group was neutralized. The neutralization degree was 83% by mole.

3 g of the obtained product and 97 g of a mixture having a weight ratio of isopropyl alcohol to water of 1:4 were weighed out in a 200 ml glass sample bottle. After the bottle was shaken with a paint shaker (manufactured by Toyo Seiki Seisaku-sho Co., Ltd.) for 1 hour, a clear solution was obtained.

EXAMPLE 8

15 g of chitosan nitrate prepared in Example 2 was put into a 500 ml glass beaker filled with 300 g of isopropyl alcohol, and stirred. After 100 g of 1 N-hydrochloric acid was added to the beaker with stirring, stirring was continued at room temperature for 2 hours. The obtained product was filtered through a glass filter and washed with a large amount of isopropyl alcohol on the glass filter, followed by drying at 80° C. for 2 hours. An amount of a free amino group of neutralized chitosan nitrate was measured according to the following procedure.

1 g of the dried sample was accurately weighed out in a 50 ml conical flask. 30 ml of 0.1 N—NaOH was added to the flask. The flask was slowly shaken by hand, and left to stand for 2 hours. Subsequently, 10 ml of supernatant liquid was taken and titrated with 0.1 N-hydrochloric acid (A ml) by using phenolphthalein as an indicator. A blank test was conducted by titrating 10 ml of 0.1 N—NaOH with 0.1 N-hydrochloric acid (Ao ml). The amount of a free amino group of neutralized chitosan nitrate was calculated according to the following formula.

The amount of the free amino group (equivalent weight/g)=(A−Ao)×factor of 0.1 N-hydrochloric acid×3×10$^{-4}$ As the result, the free amino group was not detected. Therefore, the neutralization degree of the obtained chitosan nitrate was 100% by mole.

3 g of the obtained product and 97 g of a mixture having a weight ratio of isopropyl alcohol to water of 1:4 were weighed out in a 100 ml glass sample bottle. After the bottle was shaken with the paint shaker for 1 hour, a clear solution was obtained.

EXAMPLE 9

The following components were weighed out in a 200 ml glass sample bottle with a cap to prepare a binder composition.

| (1) CMC nitrate prepared in Example 1 | 3.0 g |
|---|---|
| (2) isopropyl alcohol or ethylene glycol monobutyl ether | 19.0 g |
| (3) ion exchange water | 69.9 g |
| (4) 1N-aqueous ammonia (corresponding to 100 mole % of neutralization degree of (1)) | 8.1 g |
| Total | 100.0 g |

The sample bottle was stoppered tightly with the cap and heated to 60° C. in a water bath. Then, the bottle was shaken for 1 hour with the paint shaker and a small amount of 1 N-aqueous ammonia (4) was put into the bottle to adjust to pH 7. The bottle was left to stand for one day to remove bubbles and to obtain the solution containing CMC nitrate neutralized with ammonia. The components of the obtained binder composition are shown in Table 1-A.

The following items were evaluated.
(I) Clarity of the Solution
The above sample was judged by visual observation according to the following standard.
Standard for Judging Clarity of the Solution
⊙: Clear solution
○: Slightly clouded solution
Δ: Very clouded solution
X: Solution with precipitation Measuring Haze of the Solution
Haze of the above solution was measured with a haze computer (manufactured by Suga Test Instruments Co., Ltd.).
(II) Clarity of a Film
Using a film applicator, the solution was applied on a glass board having a smooth surface to make a film of 6 mil thick, and left to stand for one day and dried. The clarity of the resultant film was judged by visual observation according to the following standard.
Standard for Judging Clarity of the Film
⊙: Clear film
○: Slightly bluishly clouded film
Δ: Whitely clouded film
X: Uncontinuous film
Measuring Haze of the Solution
Haze of the above solution was measured in the same manner as in (I).

EXAMPLE 10

The same procedure as in Example 9 was repeated, except that the folowing components were employed.

| (1) chitosan nitrate prepared in Example 2 | 5.0 g |
|---|---|
| (2) isopropyl alcohol or ethylene glycol monobutyl ether | 19.0 g |
| (3) ion exchange water | 53.6 g |
| (4) 1N-hydrochloric acid (corresponding to 100 mole % of neutralization degree of (1)) | 22.4 g |
| Total | 100.0 g |

The results of the evaluation are shown in Table 1-B.

EXAMPLES 11 TO 13 AND COMPARATIVE EXAMPLES 5 TO 8

The same procedure as in Example 9 was repeated, except that CMC nitrate produced in Examples 3 to 5 and Comparative Examples 1 to 3 and CMC were employed and the amount of 1 N-aqueous ammonia was changed according to the neutralization degree of the nitrate. The amount of water was adjusted so as to be 100 g.

The results of the evaluation are shown in Table 1-B.

EXAMPLE 14

The same procedure as in Example 9 was repeated, except that the following components, a 200 ml pressure glass bottle were employed and the bottle was heated at 110° C. in an oven.

| (1) CMC nitrate prepared in Example 3 | 20.0 g |
|---|---|
| (2) isopropyl alcohol or ethylene glycol monobutyl ether | 40.0 g |
| (3) ion exchange water | 36.4 g |
| (4) 28% aqueous ammonia (corresponding to 100 mole % of neutralization degree of (1)) | 3.6 g |
| Total | 100.0 g |

The results of the evaluation are shown in Table 1-B.

COMPARATIVE EXAMPLE 9

The same procedure as in Example 9 was repeated, except that the following components were employed.

| | | |
|---|---|---|
| (1) | chitosan (manufactured by Kimitsu Chemical Industries Co., Ltd.) | 5.0 g |
| (2) | isopropyl alcohol or ethylene glycol monobutyl ether | 19.0 g |
| (3) | ion exchange water | 53.6 g |
| (4) | 1N-hydrochloric acid (corresponding to 100 mole % of neutralization degree of (1)) | 22.4 g |
| | Total | 100.0 g |

The results of the evaluation are shown in Table 1-B.

COMPARATIVE EXAMPLE 10

The same procedure as in Example 9 was repeated, except that the following components were employed.

| | | |
|---|---|---|
| (1) | CMC nitrate prepared in Example 1 | 3.0 g |
| (2) | isopropyl alcohol or ethylene glycol monobutyl ether | 0.0 g |
| (3) | ion exchange water | 88.9 g |
| (4) | 1N-aqueous ammonia (corresponding to 100 mole % of neutralization degree of (1)) | 8.1 g |
| | Total | 100.0 g |

The results of the evaluation are shown in Table 1-B.

COMPARATIVE EXAMPLE 11

The same procedure as in Example 9 was repeated, except that the following components were employed.

| | | |
|---|---|---|
| (1) | CMC nitrate prepared in Example 1 | 3.00 g |
| (2) | isopropyl alcohol or ethylene glycol monobutyl ether | 19.40 g |
| (3) | ion exchange water | 77.56 g |
| (4) | 1N-aqueous ammonia (corresponding to 0.5 mole % of neutralization degree of (1)) | 0.04 g |
| | Total | 100.00 g |

The results of the evaluation are shown in Table 1-B.

EXAMPLE 15

20 g of CMC nitrate prepared in Example 1 and 180 g of a mixture solvent having a ratio of methyl ethyl ketone to water of 9:1 were put into a 500 ml glass beaker. 11 g of 1 N-sodium hydroxide solution (corresponding to 20% of the neutralization degree of CMC nitrate) was added dropwise with stirring using a SURIWAN motor (trademark). The motor was changed to a homomixer. Further, 100 g of ion exchange water was added dropwise to obtain an oil-in-water type dispersion with stirring. The resultant dispersion was distilled at 50° C. under a reduced pressure of 650 to 700 mm Hg to obtain the binder composition in the form of an aqueous dispersion having the following composition.

| | | |
|---|---|---|
| (1) | CMC nitrate having 20 mole % of the neutralization degree with sodium ion | 20 wt. % |
| (2) | water | 80 wt. % |
| | Total | 100 wt. % |

The amount of residual methyl ethyl ketone was small.

No separation or precipitation was observed after the obtained binder composition was left to stand at room temperature for one month.

50 g of the above binder composition and 10 g of ethylene glycol monobutyl ether were put into a 100 ml glass sample bottle and shaken to mix for 30 minutes with a shaker. The resultant mixture was applied to a glass plate in a thickness of 3 mil by using a film applicator, and dried at room temperature for one day. As a result, a clear continuous film was obtained.

EXAMPLE 16

The same procedure as in Example 15 was repeated, except that CMC nitrate prepared in Example 6 and 0.17 g of 1 N-sodium hydroxide solution were employed.

The binder composition in the form of an aqueous dispersion having the following compositin was obtained.

| | | |
|---|---|---|
| (1) | CMC nitrate having 5 mole % of the neutralization degree with sodium ion | 20 wt. % |
| (2) | water | 80 wt. % |
| | Total | 100 wt. % |

The amount of residual methyl ethyl ketone was small.

No separation or precipitation was observed after the obtained binder composition was left to stand at room temperature for one month. The resultant mixture was applied to a glass plate in a thickness of 3 mil by using a film application, and dried at room temperature for one day. As a result, a clear continuous film was obtained.

COMPARATIVE EXAMPLE 12

The same procedure as in Example 15 was repeated, except that the amount of 1 N-sodium hydroxide solution was 0.1 g (corresponding to 0.2% by mole of the neutralization degree of CMC nitrate).

Precipitation occured in the obtained binder composition after the binder composition was left to stand at room temperature for one day.

EXAMPLE 17

20 g of the binder composition prepared in Example 9 and 5 g of a styrene-maleic acid resin (DSK-DISUKOTO N-14 (trademark) manufactured by Dai-ichi Kogyo Seiyaku Co., Ltd.; 30% aqueous solution) were weighed out in a 50 ml glass sample bottle, and mixed by hand shaking for several minutes. The appearance and cloudiness of the solution and those of the film were observed in the same manner as in Example 9. The results are shown in Table 2.

COMPARATIVE EXAMPLE 13

The same procedure as in Example 17 was repeated, except that the binder composition prepared in Comparative Example 7 was employed. The results are shown in Table 2.

COMPARATIVE EXAMPLE 14

The same procedure as in Example 17 was repeated, except that 3% by weight of CMC solution was employed. The results are shown in Table 2.

EXAMPLE 18

The following binder composition was prepared in the same manner as in Example 9.

| (1) CMC nitrate prepared in Example 5 | 1.2 g |
|---|---|
| (2) ethylene glycol monobuthyl ether | 3.9 g |
| (3) water | 17.3 g |
| (4) 1 N-NaOH | 2.9 g |
| Total | 25.3 g |

The binder composition and a styrene-maleic resin were weighed in a 100 ml glass sample bottle with a cap so as to be in the following ratio. The sample bottle was stoppered tightly with the cap, and shaken with a paint shaker for 30 minutes to prepare a mixed solution. Subsequently, 2 g of carbon black (MA-100 (trademark) manufactured by Mitsubishi Kasei Corp.) and 50 g of glass bead were put into the sample bottle, followed by shaking with the paint shaker for 2 hours to prepare an aqueous coating.

| (1) the binder composition | 25.3 g |
|---|---|
| (2) a styrene-maleic acid resin | 22.7 g |
| Total | 48.0 g |

The resultant aqueous coating was tested according to the following methods. The results are shown in Table 3.

Test for Drying Characteristic

The obtained aqueous coating was applied to a glass plate in a thickness of 3 mil by using a film applicator, and the glass plate was immediately put into a hot-air dryer adjusted at 80°±1° C. The time when no marks were left on the surface of the applied aqueous coating by touching with a finger was measured. It was judged that the shorter the time, the better the drying characteristic.

Test for Dispersibility of the Pigment

Application was conducted in the same manner as in the test for drying characteristic. After the applied aqueous coating was dried at room temperature for one day, the glossiness on the surface at 60° of angle of incidence and 60° of angle of reflection was measured. It was judged that the higher the glossiness, the better dispersibility of the pigment.

Test for Heat Resistance and Blocking Resistance

The obtained aqueous coating was applied to a piece of coated paper in a thickness of 6 mil by using the film applicator. The appplied aqueous coating was dried at room temperature for 2 hours, at 60° C. in the hot-air dryer for one day and at room temperature for one day. The dried aqueous coating was subjected to the following test.

The paper was folded so as to attach the surface of the resultant coated paper and 500 g of a weight was put on the size of 2 cm×2 cm of the paper. The paper having the weight was left to stand in an oven for 30 minutes. The temperature at which blocking occured was measured. It was judged that the higher the blocking temperature, the better the heat resistance and blocking resistance.

EXAMPLE 19

The same procedure as in Example 18 was repeated, except that the following binder and vehicle compositions were employed.

| (Binder Composition) | |
|---|---|
| (1) CMC nitrate prepared in Example 1 | 5.0 g |
| (2) isopropyl alcohol | 19.0 g |
| (3) ion exchange water | 58.9 g |
| (4) 1 N-aqueous ammonia (corresponding to 100 mole % of neutralization degree of (1)) | 13.1 g |
| Total | 96.0 g |

| (Vehicle Composition) | |
|---|---|
| (1) the binder composition | 29.3 g |
| (2) a styrene-maleic acid resin | 18.7 g |
| Total | 48.0 g |

The results are shown in Table 3.

COMPARATIVE EXAMPLE 15

The same procedure as in Example 18 was repeated, except that the following binder and vehicle compositions were employed.

| (Binder Composition) | |
|---|---|
| (1) CMC nitrate prepared in Example 5 | 1.2 g |
| (2) ethylene glycol monobutyl ether | 18.4 g |
| (3) water | 77.5 g |
| (4) 1 N-NaOH | 2.9 g |
| Total | 105.0 g |

| (Vehicle Composition) | |
|---|---|
| (1) the binder composition | 22.1 g |
| (2) a styrene-maleic acid resin | 25.9 g |
| Total | 48.0 g |

The results are shown in Table 3.

EXAMPLE 20

The following components were measured in a 100 ml glass sample bottle with a cap. The sample bottle was stoppered tightly and heated to 60° C. in a water bath. Then, the bottle was shaken for 2 hours with a paint shaker to prepare the binder composition in the form of the aqueous solution.

| (1) CMC nitrate prepared in Example 1 | 3.3 g |
|---|---|
| (2) ethyl alcohol | 10.0 g |
| (3) ion exchange water | 24.6 g |
| (4) 1 N-aqueous ammonia | 8.1 g |
| Total | 46.0 g |

15.4 g of the above binder composition, 6.3 g of a water-soluble acrylic resin (JONCRYL 61 (trademark) manufactured by S. C. Jonson & Son Inc.; 35% aqueous solution), 33.3 g of titanium oxide (TAIPEKU R820 manufactured by Ishihara Sangyo Kaisha, Ltd.) and 50 g of glass bead were put into a 100 ml glass bottle with a cap and shaken with the paint shaker for 4 hours. Further, 45 g of water-dispersible acrylic resin (JONCRYL 89 manufactured by S. C. Jonson & Son Inc.; 48% aqueous solution) was put into the bottle, and shaken by hand for 15 minutes to prepare an aqueous coating.

The obtained aqueous coating was subjected to the same procedure as in Example 18. The results are shown in Table 3.

EXAMPLE 21

The same procedure as in Example 20 was repeated, except that CMC nitrate prepared in Example 5 and ethylene glycol monobutyl ether were employed. The results are shown in Table 3.

COMPARATIVE EXAMPLE 16

The same procedure as in Example 20 was repeated, except that a mixed solvent having a ratio of ethylen to water of 1:4 was employed in the binder composition. The results are shown in Table 3.

As illustrated above, the binder composition and the aqueous coating, which contain the neutralized polysaccharide derivatives of the present invention, are the solution or dispersion that contains water and a minimum amount of the organic solvent. They are extremely excellent in drying characteristic, pigment dispersibility, heat resistance and blocking resistance. Therefore, by using these for coatings, printing compositions, paper coating, fabric surface coating and functional coatings such as magnetic coaing, electrically conductive paste, they can solve the above-mentioned problems of the conventional aqueous coating and contribute to the strongly demanded improvement in air pollution, working environment and reduced danger of fires.

TABLE 1-A

| Example | Compound | Polysaccharide derivatives | | | Component of Binder Composition | | |
|---|---|---|---|---|---|---|---|
| | | Number of nitrate group (Y) | Number of hydrophilic functiongal group (X) | Neutralization degree | Neutralized polysaccharide derivatives | Organic solvent | Water |
| Ex. 9 | CMC nitrate of Ex. 1 | 1.3 | 0.7 | 100 | 3.1 | 19.4 | 77.5 |
| Ex. 10 | Chitosan nitrate of Ex. 2 | 1.4 | 1.0 | 100 | 5.8 | 19.0 | 75.2 |
| Ex. 11 | CMC nitrate of Ex. 3 | 0.6 | 0.7 | 100 | 3.2 | 19.4 | 76.0 |
| Ex. 12 | CMC nitrate of Ex. 4 | 1.3 | 1.3 | 100 | 3.2 | 19.4 | 77.4 |
| Ex. 13 | CMC nitrate of Ex. 5 | 1.7 | 0.7 | 100 | 3.1 | 19.4 | 77.5 |
| Ex. 14 | CMC nitrate of Ex. 3 | 0.6 | 0.7 | 100 | 22 | 40 | 38 |
| Comp. Ex. 5 | CMC nitrate of Comp. Ex. 1 | 1.5 | 0.15 | 100 | 3.0 | 19.4 | 77.6 |
| Comp. Ex. 6 | CMC nitrate of Comp. Ex. 2 | 2.6 | 0.3 | 100 | 3.0 | 19.4 | 77.6 |
| Comp. Ex. 7 | CMC nitrate of Comp. Ex. 3 | 0.3 | 0.7 | 100 | 3.1 | 19.4 | 77.5 |
| Comp. Ex. 8 | CMC | — | 0.7 | 100 | 3.0 | 19.4 | 77.6 |
| Comp. Ex. 9 | Chitosan | — | 1.0 | 100 | 5.9 | 19.4 | 74.7 |
| Comp. Ex. 10 | CMC nitrate of Ex. 1 | 1.3 | 0.7 | 100 | 3.1 | 0 | 96.9 |
| Comp. Ex. 11 | CMC nitrate of Ex. 1 | 1.3 | 0.7 | 0.5 | 3.0 | 19.4 | 77.6 |

CMC nitrate: Carboxymethylcellulose nitrate; CMC: Carboxymethylcellulose

TABLE 1-B

| | Isopropyl alcohol | | | | Ethylene glycol monobutyl ether | | | |
|---|---|---|---|---|---|---|---|---|
| | Solution | | Film | | Solution | | Film | |
| Examples | Visual observation | Haze | Visual observation | Haze | Visual observation | Haze | Visual observation | Haze |
| Ex. 9 | ○ | 11.4 | ⊙ | 3.1 | ⊙ | 2.3 | Δ | 39.6 |
| Ex. 10 | ○ | 91.7* | ○ | 16.2* | ○ | 16.9 | X | N.D. |
| Ex. 11 | ⊙ | 3.1 | ⊙ | 0.8 | ⊙ | 2.3 | ○ | 12.8 |
| Ex. 12 | ○ | 6.3 | ⊙ | 0.6 | Δ | 22.3 | ⊙ | 2.3 |
| Ex. 13 | Δ | 25.9 | X | N.D. | ⊙ | 2.7 | ⊙ | 0.3 |
| Ex. 14 | ○ | 27.0 | ○ | 5.0 | — | — | — | — |
| Comp. Ex. 5 | X | N.D. | N.D. | N.D. | X | N.D. | N.D. | N.D. |
| Comp. Ex. 6 | X | N.D. | N.D. | N.D. | X | N.D. | N.D. | N.D. |
| Comp. Ex. 7 | ⊙ | 3.3 | ⊙ | 0.1 | X | N.D. | N.D. | N.D. |
| Comp. Ex. 8 | ⊙ | 2.0 | ⊙ | 0.8 | ⊙ | 3.6 | ⊙ | 6.4 |
| Comp. Ex. 9 | X | N.D. | N.D. | N.D. | X | N.D. | N.D. | N.D. |
| Comp. Ex. 10 | X | N.D. | N.D. | N.D. | X | N.D. | N.D. | N.D. |
| Comp. Ex. 11 | X | N.D. | N.D. | N.D. | X | N.D. | N.D. | N.D. |

N.D.: Not determined.;
*The value of haze is high owing to foreign matter.

TABLE 2

| Example | Example 17 | Comparative Example 13 | Comparative Example 14 |
|---|---|---|---|
| Polysaccharide derivatives | | | |
| Compound | CMC nitrate of Ex. 1 | CMC nitrate of Comp.Ex. 7 | CMC |
| Number of nitrate group (Y) | 1.3 | 0.3 | — |
| Number of hydrophilic functiongal group (X) | 0.7 | 0.7 | 0.7 |
| Neutralization degree | 100 | 100 | 100 |
| Component of vehicle composition | | | |
| Resin | 6.0 | 6.0 | 6.0 |
| Neutralized polysaccharide derivatives | 2.5 | 2.5 | 2.4 |
| Organic solvent | 15.5 | 15.5 | 15.5 |
| Water | 76.0 | 76.0 | 76.1 |
| Solution | | | |
| Visual observation | ○ | Δ | Δ |
| Haze | 9.0 | 24.0 | 18.0 |
| Film | | | |
| Visual observation | ⊙ | X | X |
| Haze | 1.5 | N.D. | N.D. |

CMC nitrate: Carboxymethylcellulose nitrate
CMC: Carboxymethylcellulose
N.D.: Not determined.

TABLE 3

| | | Component of aqueous coatings | | | | | | | |
|---|---|---|---|---|---|---|---|---|---|
| Examples | Polysaccharide derivatives | Water-soluble/ dispersible resin | Neutralized polysaccharide derivatives | Organic solvent | Water | Pigment | Drying characteristic (sec.) | Glossiness | Sticking temperature (°C.) |
| Ex. 18 | CMC nitrate of Ex. 7 | 13.6 | 2.4 | 7.8 | 72.2 | 4.0 | 60 | 60 | 150 |
| Ex. 19 | CMC nitrate of Ex. 1 | 11.2 | 2.9 | 11.2 | 70.7 | 4.0 | 55 | 10 | 150 |
| Comp. Ex. 15 | CMC nitrate of Ex. 1 | 15.5 | 0.5 | 8.1 | 71.9 | 4.0 | 80 | 46 | 120 |
| Ex. 20 | CMC nitrate of Ex. 1 | 24.8 | 1.1 | 3.3 | 37.5 | 33.3 | — | 63 | — |
| Ex. 21 | CMC nitrate of Ex. 5 | 24.8 | 1.1 | 3.3 | 37.5 | 33.3 | — | 65 | — |
| Comp. Ex. 16 | — | 24.8 | — | 3.1 | 38.8 | 33.3 | — | 46 | — |

CMC nitrate: Carboxymethylcellulose nitrate

What is claimed is:

1. A binder composition comprising
    (a) 1 to 40% by weight of a polysaccharide derivative having the formula

    $$\{GLU.(OCH_2COOH)_x(ONO_2)_{Y(OH)Z}\}_n \qquad (I)$$

wherein GLU. represents a glucose residue, the hydrophilic carboxymethyl ether functional groups of said polysaccharide derivative being neutralizable and the nitrate groups of said polysaccharide derivative being linked directly to the polysaccharide structure, wherein said hydrophilic and nitrate groups are either part of an existing polysaccharide or introduced via modification of an existing polysaccharide, and hydroxyl groups per one repeating unit, respectively, in the following range: X is greater than or equal to 0.2 and less than or equal to 1.5, Y is greater than or equal to 0.4 and less than or equal to 2.2, X+Y+Z=3; and n is an integer in the range of 20 to 1000,
    wherein X, Y, and Z represent the numbers of hydrophilic functional groups, nitrate groups, and hydroxyl groups per one repeating unit in the polysaccharide derivative, respectively;
    and having at least 1% by mole of the neutralizable hydrophilic functional groups neutralized with at least one base;
    (b) 1 to 45% by weight of an organic solvent that is compatible with water; and
    (c) 30 to 98% by weight of water, said binder composition being an aqueous solution wherein the neutralized polysaccharide derivatives are substantially dissolved in components (b) and (c) or an aqueous dispersion wherein the neutralized polysaccharide derivatives are substantially uniformly dispersed in components (b) and (c).

2. The binder composition according to claim 1, wherein the base is a member selected from the group consisting of an alkali metal compound, ammonia, and an organic amine having one amino group in one molecule.

3. The binder composition according to claim 1, wherein the amount of the organic solvent is 20% by weight or less.

4. The binder composition according to claim 1, wherein the organic solvent is water-soluble.

5. A vehicle comprising (a) 1 to 45% by weight of a polysaccharide derivative having the formula $$\{GLU.(OCH_2COOH)_x(ONO_2)_y(OH)_z\}_n \qquad (I)$$

wherein GLU. represents a glucose residue, the hydrophilic carboxymethyl ether functional groups of said polysaccharide derivative being neutralizable and the nitrate groups of said polysaccharide derivative being linked directly to the polysaccharide structure, wherein said hydrophilic and nitrate groups are either part of an existing polysaccharide or introduced via modification of an existing polysaccharide, and hydroxyl groups per one repeating unit, respectively, in the following range:

X is greater than or equal to 0.2 and less than or equal to 1.5, Y is greater than or equal to 0.4 and less than or equal to 2.2, X+Y+Z=3; and n is an integer in the range of 20 to 1000, wherein X, Y, and Z represent the numbers of hydrophilic functional groups, nitrate groups, and hydroxyl groups per one repeating unit in the polysaccharide derivative, respectively;

and having at least 1% by mole of the neutralizable hydrophilic functional groups neutralized with at least one base;

(b) 1 to 45% by weight of an organic solvent that is compatible with water;

(c) 30 to 93% by weight of water; and (d) 5 to 49% by weight of a water-soluble resin and/or a water-dispersible resin;

wherein the total amount of components (a) and (d) is in the range of 6 to 50% by weight, said vehicle comprising an aqueous solution wherein the neutralized polysaccharide derivatives are substantially dissolved in components (b)–(d) or an aqueous dispersion wherein the neutralized polysaccharide derivatives are substantially uniformly dispersed in components (b)–(d).

6. The vehicle composition according to claim 5, wherein the base is a member selected from the group consisting of an alkali metal compound, ammonia, and an organic amine having one amino group in one molecule.

7. The vehicle composition according to claim 5, wherein the organic solvent is water-soluble.

* * * * *